Sept. 22, 1953  J. L. RISCO  2,652,765
FLAVORING DEVICE
Filed March 26, 1949

INVENTOR.
Joseph L. Risco
BY George J. Smyth
ATTORNEY

Patented Sept. 22, 1953

2,652,765

UNITED STATES PATENT OFFICE 2,652,765

FLAVORING DEVICE

Joseph L. Risco, Los Angeles, Calif.

Application March 26, 1949, Serial No. 83,723

5 Claims. (Cl. 99—345)

1

This invention relates to seasoning and flavoring devices and more particularly to such a device for seasoning and flavoring meats or other articles of food during the cooking operation.

Various devices have heretofore been proposed for seasoning and flavoring food articles during the cooking operation. Some of these prior devices have consisted of open ended, elongate, hollow members for receiving seasoning and flavoring materials and which were adapted to be imbedded within the food articles. These members were formed with perforations through which the seasoning and the flavoring materials were intended to pass into the food article during the cooking operation. It has also been proposed to season and flavor food articles during the cooking operation by means of a shallow, pan-like receptacle formed with a plurality of hollow, tapered members depending from the bottom wall thereof and provided with apertures through which seasoning fluids held by the shallow receptacle could pass into the food article in which the tapered members were imbedded.

These prior devices have not served their intended purpose for several reasons, the most important reason being that most, if not all, of the fluids held thereby merely vaporized during the cooking operation and evaporated into the oven or other cooking device in which the article was being cooked. This was particularly true of the type in which the seasoning fluids were held by a shallow, pan-like receptacle, for obviously here a large surface area of the fluid was exposed to the heated air in which the food article was being cooked.

Although a small amount of fluid held by the prior devices would at the outset flow through the apertures or perforations of the portion imbedded in the meat or other food article, the tissue of the meat soon expanded into and closed the perforations to further flow of the fluid. The fluid thereafter merely evaporated and the food article was not seasoned or flavored to the extent desired.

In the device of the present invention, vapors of the fluids to be introduced into the meat or the like cannot escape and, in fact, are used to create a pressure on the fluids which forces the fluids into the meat during the cooking operation.

The device of the present invention, in the broadest aspects thereof, comprises a sealable container for holding flavoring and seasoning fluids terminating in a perforated tubular member adapted to be imbedded within a food article.

2

As the container is sealed, vapors of the fluids created by the heating of the same during the cooking operation are held against escape and thus create within the container a pressure which is adequate to force the fluids through the perforations of the tubular member and into the article during the cooking operation.

In the now preferred embodiment of the device of the present invention, the container is open at the top and is progressively decreased at its lower end to form a hollow, elongate tapered member which can be introduced into the article to be cooked. The hollow, elongate tapered member is provided with a plurality of apertures or perforations through which fluids may pass into the article with which the device is being used.

A small receptacle for holding condiments and other seasoning and flavoring material is supported within the container so that water or other fluids introduced within the container are seasoned and flavored thereby. The open end of the container is closed by a closure element having means cooperable with means carried by the container for hermetically sealing the same. Thus, as the container is hermetically sealed, vapors of the seasoned and flavored fluids held by the container cannot escape and as hereinabove mentioned create a pressure within the container to pressurally force the fluids through the perforations of the tapered member imbedded within the article being cooked.

To limit the pressure created within the container as the fluids vaporize during the cooking operation, a small pressure relief valve is provided which prevents the pressure from exceeding the bursting strength of the device. Thus, as the danger of the pressure exceeding the strength of the container is obviated, there is no danger of the sealed container bursting under the internal pressure generated within the same.

Other features and advantages of the present invention will be apparent from the following description taken in connection with the accompanying drawing, in which.

Figure 1:
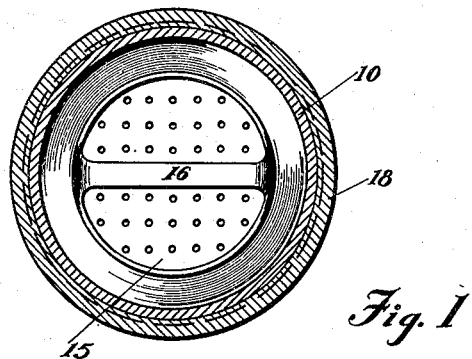
Figure 1 is a horizontal section taken along line 1—1 of Figure 2.
Figure 2:
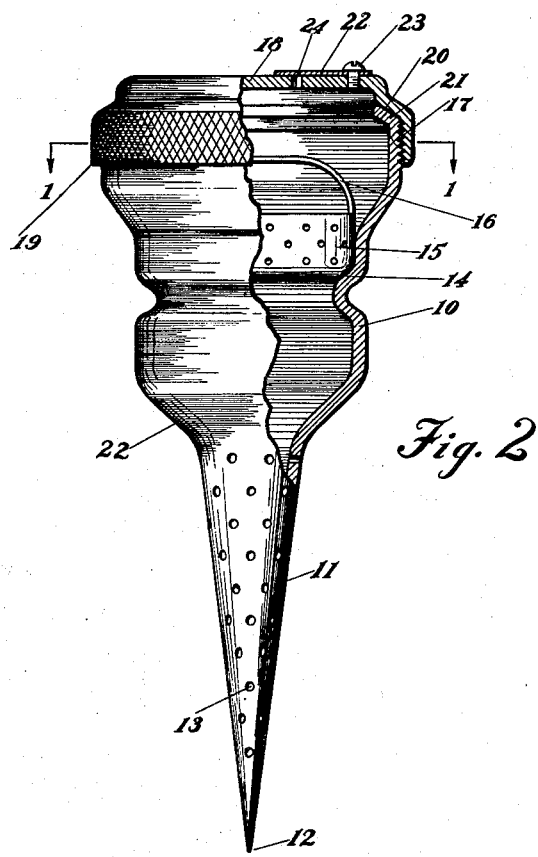
Figure 2 is an elevational view of the device of the present invention with the wall of the container partly broken away to illustrate the interior of the container.

The seasoning device of the present invention, referring now to the drawing, comprises a container 10, preferably formed of a metal, open at the top thereof and terminating at its lower end in an elongate, hollow, tapered member 11 formed at its lower extremity with a piercing point 12. The tapered member 11 is provided with a plurality of small apertures or perforations 13 spaced about the wall thereof.

Although the tapered member 11 has been shown as integrally formed with the body of the container 10, it is obvious that it could be separately formed and later assembled with the container by a conventional welding or brazing process. If the tapered member is separately formed and subsequently joined to the container care must be taken to insure that an airtight joint between the container and the member is formed, for any openings in the joint would render the device inoperative for its intended use.

The container 10 is provided with an annular shoulder 14 for supporting within the container a small, perforated receptacle 15. Although the annular shoulder 14 may be formed by any means desired, in the now preferred embodiment of the invention, this shoulder is formed by merely rolling an annular groove about the container to force inwardly an annular portion of the wall thereof.

The receptacle 15 may be as shown, somewhat basket-like in shape, and is provided with a fixed bail or handle 16 to facilitate removal of the receptacle from the container. The receptacle is to support condiments and flavoring material, such as garlic, bay leaves, pepper seeds, or other spices customarily used in flavoring food articles. The perforations of the receptacle should be small enough to prevent the condiments and flavoring materials from entering the hollow, tapered member 11, where they might plug or close the apertures 13 formed in the wall thereof.

The upper portion of the wall of the container 10 is formed with external threads 17 cooperating with complementary internally formed threads of a closure member 18 to the end that the closure member can be threaded onto the container to close the upper end thereof. The outer surface 19 of the cylindrical wall element of the closure member 18 is preferably knurled to facilitate threading of the closure onto the container.

As any gasket material might impart an odor or undesirable flavor to the food article, it is now preferred not to use a gasket element to seal the opening closed by the closure member 18. To effect the necessary seal, the extreme upper wall portion of the container 10 is flared inwardly to form about the opening a conical surface 20 which, when the closure member 18 is threaded down onto the container, sealingly engages and seats against a complementary conical surface 21 formed about the interior of the closure member 18.

In the use of the device of the present invention, the tapered member 11 is thrust or imbedded within the article to be flavored, and care must be taken to insure that this member is imbedded within the article to a depth sufficient to bring the downwardly facing wall surface 22 into engagement with the article or at least to a depth sufficient to cover all of the apertures 13 formed in the wall of the tapered member.

With the device now supported on the article to be cooked, the condiments and flavoring materials can be introduced into the receptacle 15 through the open end of the container 10. After the seasoning and flavoring materials are deposited in the receptacle 15, water, melted fats, and other fluids can be poured into the container until the receptacle is well covered by the fluids. The closure member 18 is now threaded down onto the container until the surfaces 20 and 21 are brought into good sealing engagement.

After the food article is placed in the oven or other device in which it is to be cooked, the head of the cooking process causes the fluids held by the container, and which now have been seasoned and flavored by the material held by the receptacle 15, to vaporize. The vapors of the fluids obviously will create within the sealed container a pressure higher than atmospheric and thus pressurally urge the fluids out through the apertures 13 and into the article being cooked.

To prevent the pressure within the container from exceeding the bursting strength of the walls of the container, a pressure relief valve is either carried by the container itself or the closure member 18. Although this pressure relief valve may be of any type and construction desired, in the illustrated embodiment of the invention this valve comprises a small, flat strip 22 anchored at its one end to the upper surface of the closure member 18. The strip 22 can be anchored at its one end by any fastening means desired, this means being here shown as a small screw 23. The strip 22 covers a small passage 24 formed through the upper wall of the closure member 18 and thus prevents the escape of steam and vapors from the device in the ordinary use of the same.

The strip 22 is formed of some resilient material, such as spring steel, and will be resiliently urged upwardly by the pressure created within the container to open the passage 24 to permit escape of the steam and vapors if the pressure exceeds one determined to impose stresses within the material in excess of its bursting strength. Obviously, after sufficient steam and vapor has escaped through the opened passage 24 to decrease the pressure within the container to one less than the predetermined pressure, the resilient strip 22 will be by its own resiliency returned to its normal position closing the passage 24. Thus there is no danger of the container bursting in use, for any dangerous pressures generated within the container will be relieved by operation of the pressure relief valve formed by the resilient strip 22.

It will be seen that the device is quite easily cleaned, for after the closure member 18 is removed from the container the receptacle 15 may be very easily lifted from its position on the shoulder 14 by merely grasping the bail or handle 16 and withdrawing the receptacle from the container.

If it is discovered in cleaning the device after its use that the seasoning and flavoring materials used have tended to clog the passage 24, they can be easily removed from the passage by merely backing out the screw 23 until the strip 22 can be swung to one side to uncover the passage 24. After the passage 24 has been cleaned of the flavoring and seasoning materials which may have lodged therein, strip 22 can be returned to its normal position closing the passage 24 and the screw 23 again tightened.

Although the now preferred embodiment of the device of the present invention has been herein illustrated and described, it is to be understood that the invention is not to be limited thereto, for it is susceptible to changes in form and detail within the scope of the appended claims.

I claim:

1. A seasoning device of the type described, comprising: a container open at the top thereof and terminating at its lower end in a perforated hollow, tapered tubular member adapted to be introduced into an article of food to be cooked; an annular shoulder formed internally of said container; a perforated receptacle supported on said shoulder, adapted to receive solid condiments for flavoring and seasoning fluids held by said container; and a closure member for hermetically sealing the open end of said container whereby the heat of the cooking operation vaporizes a portion of the condiment flavored fluids to produce within said container a pressure sufficient to force said fluids through the perforations of said tubular member and into the article being cooked.

2. A seasoning and flavoring device of the type described, comprising: a hollow, downwardly tapered, perforated plug formed at its lower end with a piercing point whereby said plug can be forcibly thrust into an article of food to be cooked; an imperforate walled container carried at the upper end of said plug and communicating therewith; an apertured member adapted to receive condiments; means for mounting said member within said container; said container having an opening at the upper end thereof for admitting fluids to be seasoned and flavored by said condiments into the same after said plug is thrust into said article; and a closure member for closing and hermetically sealing said opening whereby the heat of the cooking operation causes a portion of said condiment seasoned and flavored fluids to vaporize, whereby there is created above said fluids a pressure sufficient to force said fluids through said perforated plug and into the article to be cooked.

3. A seasoning device of the type described, comprising: a container open at the top thereof and terminating at its lower end in a hollow, tapered tubular member; a piercing point carried at the lower end of said member for facilitating introduction of said member into an article of food to be cooked; an annular shoulder formed internally of said container; a perforated receptacle supported on said shoulder, adapted to receive solid condiments for flavoring and seasoning fluids held by said container; a closure member for hermetically sealing the open end of said container whereby the heat of the cooking operation vaporizes a portion of the condiment flavored fluids to produce within said container a pressure sufficient to force said fluids through the perforations of said tubular member and into the article being cooked; and means for limiting the pressure within said container to a preselected one.

4. A seasoning device of the type described, comprising: a container open at the top thereof; an apertured, elongate hollow member carried by said container communicating with the interior of the same adjacent the lower end thereof, said member adapated to be imbedded within an article of food to be cooked for supporting said container thereon in a substantially vertical position; a closure member formed with internal threads adapted to threadedly engage external threads formed about the open end of said container; and complementary conical sealing surfaces carried by said container and said closure member adapted to sealingly engage each other when said closure member is threaded onto said container to hermetically seal the open end of said container after seasoning fluids have been introduced therein, the heat of the cooking operation generating vapors of the seasoning fluids within said sealed container to create therein a pressure sufficient to force said fluids through the apertures of said hollow member imbedded within the article being cooked.

5. A seasoning device of the type described, comprising: a metallic container open at one end thereof and terminating at the opposite end in a tapered, perforated, tubular member adapted to be introduced into an article of food for supporting said container thereon during the cooking operation; a perforated member carried within said container for holding solid condiments against passage into said tubular member while passing fluids flavored and seasoned thereby; and a removable metallic closure member for closing and hermetically sealing the open end of said container, the heat of said cooking operation vaporizing at least a part of the fluids held by said hermetically sealed container to create within said sealed container a pressure sufficiently high to pressurally urge said fluids through the perforations of the tubular member imbedded within said article and into the latter to flavor and season the same during the cooking operation.

JOSEPH L. RISCO.

References Cited in the file of this patent

UNITED STATES PATENTS

| Number | Name | Date |
|---|---|---|
| 1,038,217 | Siegrist | Sept. 10, 1912 |
| 1,661,595 | Bowen | Mar. 6, 1928 |
| 2,075,407 | Schwartzman | Mar. 30, 1937 |
| 2,116,310 | Harvey | May 3, 1938 |
| 2,350,623 | Kruea | June 6, 1944 |
| 2,473,191 | Bettencourt | June 14, 1949 |

FOREIGN PATENTS

| Number | Country | Date |
|---|---|---|
| 3,705 | Great Britain | Oct. 30, 1902 |
| 293,092 | Great Britain | June 26, 1928 |